Feb. 8, 1955    K. D. ASHLEY    2,701,793
PRODUCTION OF SILICA-ALUMINA GEL CATALYSTS
Filed Dec. 23, 1949
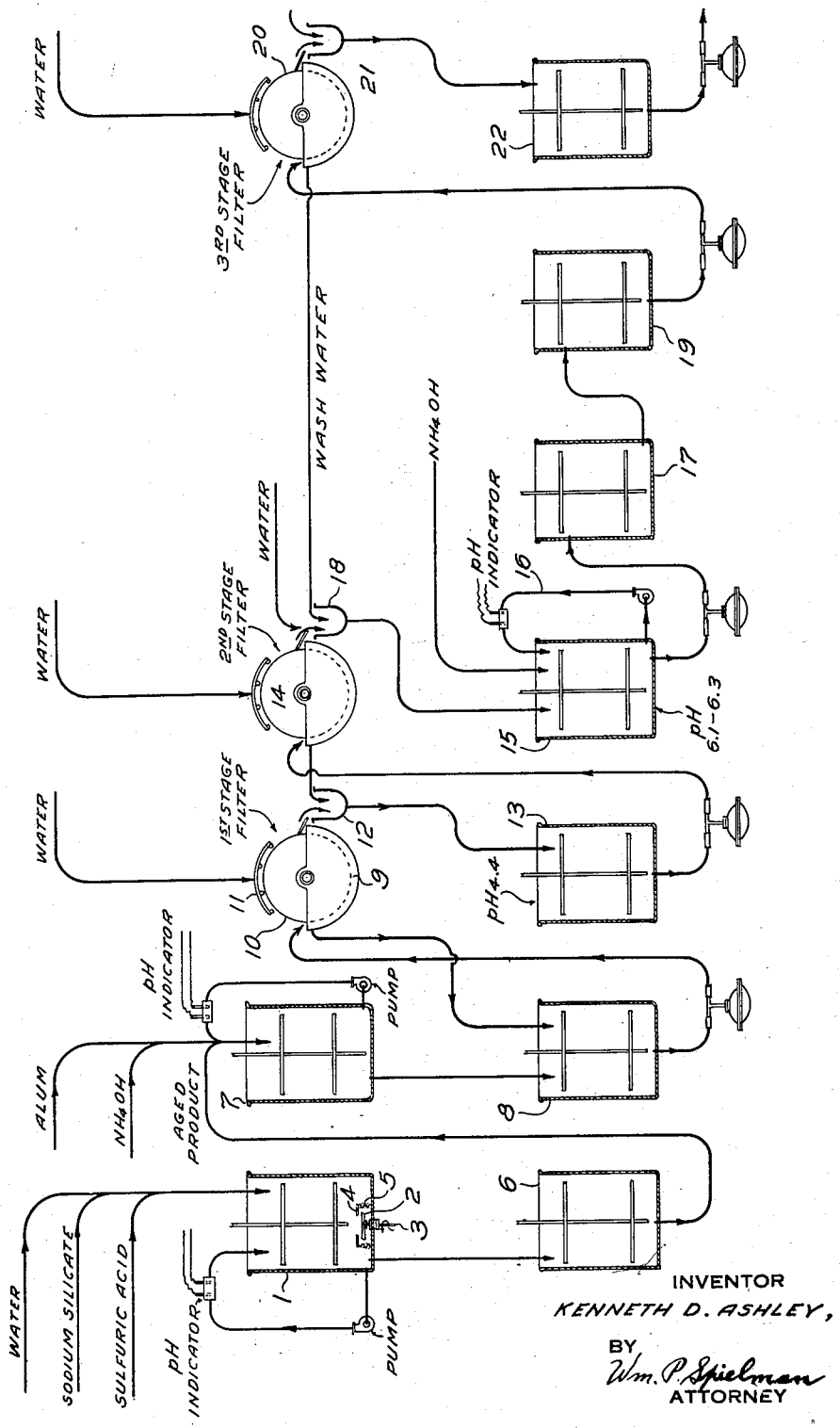
INVENTOR
KENNETH D. ASHLEY,
BY
Wm. P. Spielman
ATTORNEY

United States Patent Office 2,701,793
Patented Feb. 8, 1955

2,701,793

PRODUCTION OF SILICA-ALUMINA GEL CATALYSTS

Kenneth D. Ashley, Stamford, Conn., assignor to American Cyanamid Company, New York, N. Y., a corporation of Maine Application December 23, 1949, Serial No. 134,807

2 Claims. (Cl. 252—451)

This invention relates to a method for the production of silica-alumina gel catalysts, and more particularly to the production of catalysts of this type having an improved porosity and a low fixed sulfate content and therefore an improved activity and stability.

Catalysts composed of or containing silica and alumina gels, with or without magnesium oxide, zirconium oxide or other additional promoters, are now in wide commercial use for the catalytic cracking of petroleum hydrocarbons. Silica-alumina gel catalysts containing from about 10% to about 50% or more of alumina, the balance being substantially all silica, are used for the production of high octane gasoline. Silica-alumina-magnesia catalysts containing about 25–35% magnesia and about 1–5% alumina, the balance being substantially all silica, are sometimes used where higher yields of gasoline are desired.

Alumina-containing catalysts of this class are most frequently prepared by adding a water solution of aluminum sulfate to an aqueous suspension of gelatinous hydrated silica, followed by adding sufficient ammonium hydroxide to precipitate the aluminum in the silica gel as aluminum oxide. The mixed silica-alumina gel is then dewatered and washed to remove sodium sulfate or other alkali metal salts and is then dried by calcination in a stream of hot gases to produce the finished catalyst.

When an aqueous suspension of silica gel or gelatinous silica is impregnated with aluminum oxide by the above procedure, a small but substantial proportion of basic aluminum sulfate [$Al_2(OH)_4SO_4$] is formed. This basic aluminum sulfate is not removed in the subsequent dewatering and washing steps which are used to remove sodium sulfate or other water-soluble salts from the catalyst, and the finished catalyst therefore has a substantial fixed sulfate content. Catalyst prepared on a commercial scale by the process described in my U. S. Patent No. 2,478,519 and composed of about 12% alumina and 88% silica ordinarily contains about 1.5% to 2% of combined or fixed —$SO_4$; in catalysts containing larger quantities of alumina the fixed sulfate content will of course be greater.

It is a principal object of the present invention to provide a commercially feasible method for the removal of the greater part of the combined or fixed sulfate from alumina-silica catalysts of the above described class. A second important object is the provision of a method for accomplishing this purpose which will produce a catalyst of greater porosity and lower apparent density, and therefore of higher activity. Still further objects will become apparent from the following description of preferred embodiments of the invention.

The invention will be described in greater detail with reference to the attached drawing, the single figure of which is a flow sheet wherein the various steps of the catalyst manufacturing process are illustrated diagrammatically. Referring to this drawing, a dilute aqueous solution of sodium silicate is first prepared in the precipitator or strike tank 1, preferably at a concentration which will form a slurry containing about 3–6% of gelatinous silica after acidification. The tank 1 is preferably an open cylindrical tank having a high speed turbine-type agitator 2 attached to a shaft 3 which passes through the bottom of the tank. This agitator is surrounded by an annular framework 4 having an outer cylindrical screen 5 of 6–8 meshes per inch. Sulfuric acid of 25% strength is added to the sodium silicate solution in the tank 1 while the agitator 2 is operated, the silica slurry being drawn in at the top of the agitator and discharged through the screen. The acid addition is continued until the pH of the slurry in the tank 1 remains constant at a value between 4 and 6. The resulting aqueous slurry of gelatinous silica is then aged in the tank 6 for about 0.25–5 hours, and preferably for about 0.5–2 hours as described and claimed in my Patent No. 2,478,519 referred to above. The silica is then ready for impregnation with alumina and for filtration and washing.

The precipitated and aged silica slurry, having a solids content of about 3–6%, is run into the tank 7 and a water solution containing the desired quantity of aluminum sulfate is added with agitation. As has been stated, sufficient aluminum sulfate may be used to incorporate from about 10% to 25% or more of $Al_2O_3$ in the finished catalyst, or, in making a three-component silica-alumina-magnesia catalyst, quantities corresponding to 1–5% of $Al_2O_3$ may be used. In all cases, however, it is desirable to first add sufficient sulfuric acid to the aged silica slurry in the tank 7 to reduce the pH to about 3–3.5; the requisite quantity of aluminum sulfate solution is then introduced. After sufficient agitation to obtain a uniform distribution of aluminum sulfate throughout the hydrated gelatinous silica, a quantity of ammonium hydroxide is added slowly which is sufficient to precipitate all of the aluminum. The aluminum is completely precipitated when the pH has been raised to about 4.5–5.3. As has been noted above, a substantial quantity of basic aluminum sulfate is formed in the catalyst during this precipitating step.

Experience has shown that it is very difficult or impossible to obtain a filtration and washing that is adequate for alkali metal salt removal when the pH in the alumina precipitating step is carried above about 5.5. The silica-alumina gel is therefore discharged from the impregnating tank 7 into the first filtration stage feed tank 8 and is pumped from this tank to the feed trough 9 of the first rotary filter 10 at a pH of from 4 to 5.5 and preferably 4.5–4.8; this results in a filter cake about 0.75 inch thick which is easily washed on the filter. The wash water is preferably acidified to a pH of about 3.5, and is applied to the filter cake by sprays 11 in amounts of about 3–4 gallons per minute.

The filter cake from the first stage filter 10 is repulped with water in a repulping trough 12 and is passed to storage tank 13, from which it is passed over the second stage filter 14. On this filter the silica-alumina gel is again dewatered and washed with acidified wash water, with the result that the greater part of the remaining alkali metal salts are removed from the silica gel. In most cases more than 99% of the sodium sulfate or other alkali metal salt is removed from the catalyst gel by the first two stages of filtration.

In accordance with the present invention the substantially sodium-free filter cake from the second stage filter 14 is leached to remove fixed sulfate and to improve the porosity of the finished catalyst. This is accomplished by repulping the filter cake in water and simultaneously or subsequently adding sufficient ammonium hydroxide to maintain the pH between 6.0 and 7.0, and preferably at 6.1–6.5. My experiments have shown that the fixed sulfate can be leached from the basic aluminum sulfate at pH values of 6.0 and higher within a period of about 0.25–1.5 hours, depending on the pH and on the quantity of alumina in the catalyst. A gel containing 88% silica and 12% alumina, when leached at a pH of 6.1–6.3 by this method for 0.5 hour, produced a finished catalyst containing only 0.5% of fixed sulfate. The same gel, when dried by contact with hot gases in a rotary kiln, produced a catalyst containing 1.6% of fixed sulfate when no leaching was used.

As is shown on the drawing, the cake from the filter 14 is preferably discharged into a repulper 18 along with sufficient water to make a slurry of about 4% to 8% solids content. The resulting slurry is passed into a leaching tank 15 to which sufficient ammonium hydroxide is added to produce the desired pH for leaching and wherein it is maintained under gentle agitation for from 10 to 30 minutes or longer. The tank 15 is equipped with a recirculating line 16 which contains a pH indicator so that the pH of the slurry can be carefully controlled. Wash water from the filter 20 may be used in preparing the slurry in the repulper 18 in which case its volume and acidity are considered in calculating the amount of ammonia to be added.

In order to provide a sufficient leaching time in a continuous process a number of leaching tanks may be used. Thus, for example, two additional tanks 17 and 19 are shown on the drawing. These tanks are provided with gate-type agitators which promote the leaching of fixed sulfate from the silica-alumina gel by keeping the gel particles suspended uniformly in the ammoniacal leaching liquor. It will be understood that these tanks may be operated either in series, as shown, or in parallel to obtain any desired leaching time within the range of about 15 to 90 minutes, depending on the proportion of alumina in the silica-alumina gel. As is indicated above, gels containing 10–20% of alumina and 80–90% of silica require about 15 to 45 minutes leaching at pH values of 6.1 to 6.5 to remove up to 75% of their fixed sulfate content; gels containing more alumina may require longer leaching times.

When the leaching has been completed to the desired extent the slurry is dewatered and washed once or twice to remove the ammonium sulfate and also to reduce still further its content of alkali metal salts. As is shown on the drawing this may be accomplished by pumping the slurry from the tank 17 over a filter 20 which is preferably supplied with wash water having a pH of about 3.8. The cake from this filter is suspended in water in a repulper 21 and may again be filtered and washed when a catalyst having an alkali metal salt content less than 0.5% Me₂O is desired. The resulting filter cake, or the cake from the filter 20 if a fourth filtration is not used, is then dried by contact with hot gases to produce the finished catalyst. This may be done by passing it through an inclined rotary kiln in countercurrent contact with a stream of hot products of combustion having an inlet temperature of 1200°–1400° F., as described in my patent referred to above.

It will be understood that, although the leaching of the silica-alumina gel may be carried out at a pH of about 6.0 or higher, unusually high pH values are to be avoided. This is true because the filtration rate on the final filter 20 is very poor if a pH above 6.8 is used for leaching. The preferred pH values in the leaching process are from 6.1 to 6.6, since this accomplishes the sulfate removal in a reasonably short time without retarding the filtration rate of the resulting slurry to an undesirable extent.

Another important advantage obtained by the leaching process of my invention is its unexpectedly great improvement in the porosity of the catalyst. Tests with a 12% alumina catalyst have shown a 25% decrease in the bulk density of the finished catalyst, with a corresponding increase in the pore volume. Catalysts prepared by the improved process of my invention show slightly higher initial activity and greatly improved steam and thermal stability, as compared with catalysts prepared by the same method but without the leaching step.

The invention will be described in greater detail by the following specific examples.

*Example 1*

A silica-alumina gel containing, on the dry basis, 87% of silica and 13% of alumina was prepared by acidifying an aqueous sodium silicate solution, aging, impregnating with aluminum sulfate solution and adding sufficient ammonium hydroxide to precipitate all the aluminum as has been described. A portion of this gel, after repeated filtration and washing with acidified water to remove alkali metal salts to a content of less than 0.5% Me₂O, was calcined in a rotating kiln supplied with gases at 1200° F. to produce a finished catalyst that was labeled Sample 1. Another portion (Sample 2) was twice filtered and washed with acidified water until more than 99% of the alkali metal salts were removed and was then leached with dilute ammonium hydroxide at a pH of 6.1–6.3 for 30 minutes, filtered and washed, and calcined in a stream of hot gases at 1200° F.

The catalysts were tested for activity by the standard test method which consists in passing the vapors of 25 grams of a Mid Continent gas oil charging stock over 100 grams of catalyst at 900° F. during 15 minutes. The percentage of the oil converted to gasoline boiling below 400° F. is termed conversion. Activity tests were made on fresh catalyst and also on catalyst that had been heated for 350 hours at 1050° F. in an atmosphere of steam. The bulk density, pore volume in cubic centimeters per gram and average pore diameter in Angstrom units were also determined, with the following results:

|  | Percent SO₃ | Bulk Density | Pore Volume | Pore Diameter | Conversion | |
|---|---|---|---|---|---|---|
|  |  |  |  |  | Fresh | Steamed |
| Sample 1 | 1.8 | 0.57 | 0.49 | 39 | 87 | 53 |
| Sample 2 | 0.43 | 0.45 | 0.80 | 80 | 88 | 62 |

Among the improvements in the catalyst that are shown by these figures the reduction in bulk density is particularly advantageous. This is the case because too high a density causes uneven distribution or "slugging" when the catalyst is fluidized in the fluid stream cracking process. This difficulty is most often encountered with catalyst that has been regenerated repeatedly, as the repeated burning out of the carbonaceous impurities causes a gradual increase in the density of the catalyst. By providing a catalyst having a substantially reduced bulk density the present invention increases the number of times the catalyst can be regenerated in the fluid stream cracking process without reaching the stage where its density is too high for efficient fluidizing, and thereby increases its effective life.

*Example 2*

A slurry of gelatinous silica was prepared by acidifying an aqueous sodium silicate solution with 25% sulfuric acid while forcing the slurry through a screen by means of a high speed agitator. The resulting slurry was aged for 2 hours at 70° F. and 5% solids at a pH of 6.5 and was then divided into four portions. These were impregnated with 15%, 20%, 25% and 30%, respectively, of Al₂O₃, based on the dry weight of the finished catalyst, by the procedure previously described; i. e., by mixing with aluminum sulfate solution and then precipitating with ammonium hydroxide. The gel slurries were then filtered and washed until more than 95% of the alkali metal salt content was removed.

Each of the four portions was divided into two parts marked *a* and *b*. The *a* parts were slurried in water and again filtered and washed to an alkali metal salt content of 0.02% or less and then calcined in a stream of hot gases at 1200° F. in a rotary kiln. The *b* parts were slurried in water and ammonium hydroxide was added, after which the slurries were leached with gentle agitation for sulfate removal. Portions Nos. 1 and 2, containing 15% and 20% of Al₂O₃, respectively, were leached for 30 minutes at pH values of 6.2–6.4. Portion No. 3, containing 25% Al₂O₃, was leached 45 minutes at a pH of 6.4. Portion No. 4 was leached for one hour at a pH of about 6.5; this was done by first adding sufficient ammonia to the slurry to obtain a pH of 6.5, then agitating for 15 minutes when the pH had fallen to 6.1, and then adding more ammonia to raise the pH to 6.5 again and continuing the agitation for an additional 45 minutes. The (*b*) parts were then filtered and washed to an alkali metal salt content of 0.02% or less and calcined at 1200° F.

Samples of the catalysts were analyzed for sulfate. Other samples were tested for initial catalytic activity and thermal stability at a space velocity of 4; i. e., using 25 grams of vaporized charging stock per 100 grams of catalyst at 900° F. and a contact time of 15 minutes. The thermal stability tests were made on catalyst that had been heated for two hours at 1112° F. and then at 1652° F. for six hours. The results are given in the following table:

| No. | Al₂O₃ | Percent Sulfate as SO₃ | | Catalytic Activity | |
|---|---|---|---|---|---|
|  |  | (a) | (b) | Initial | Thermal |
| 1 | 15 | 2.1 | 0.31 | (a) 95 | 62 |
|  |  |  |  | (b) 104 | 68 |
| 2 | 20 | 3.9 | 0.47 | (a) 99 | 56 |
|  |  |  |  | (b) 100 | 61 |
| 3 | 25 | 4.2 | 0.55 | (a) 92 | 55 |
|  |  |  |  | (b) 91 | 68 |
| 4 | 30 | 7.3 | 0.65 | (a) 77 | 64 |
|  |  |  |  | (b) 75 | 66 |

(*a*) Unleached Catalyst.
(*b*) Leached Catalyst.

What I claim is:

1. A method of producing a silica-alumina gel catalyst of improved stability and porosity and low fixed sulfate content which comprises preparing an aqueous suspension of gelatinous hydrated silica, mixing a water solution of aluminum sulfate therewith, adding ammonium hydroxide and thereby precipitating in said gelatinous silica a hydrated aluminum oxide containing basic aluminum sulfate, filtering and washing the resulting gel with acidified water to remove water-soluble salts therefrom, leaching the gel for at least 15 minutes in water to which sufficient ammonia has been added to bring the pH of the gel slurry to a value between 6.1 and 6.5 in order to remove fixed sulfate therefrom, filtering and washing the gel slurry and drying the gel by contact with a stream of hot gases.

2. A method of producing a silica-alumina gel catalyst of improved stability and porosity and low fixed sulfate content which comprises preparing an aqueous suspension of gelatinous hydrated silica, mixing therewith a water solution of aluminum sulfate containing the equivalent of about 10–30% of $Al_2O_3$ based on the dry weight of the finished catalyst, adding ammonium hydroxide and thereby precipitating all the aluminum in said gelatinous silica as a hydrated aluminum oxide containing basic aluminum sulfate, filtering and washing the resulting gel with acidified water to remove water-soluble salts therefrom, leaching the gel for at least 15 minutes in water to which sufficient ammonia has been added to bring the pH of the gel slurry to a value between 6.1 and 6.5 in order to remove fixed sulfate therefrom, filtering and washing the gel slurry and drying the gel by contact with hot gases.

References Cited in the file of this patent

UNITED STATES PATENTS

| Number | Name | Date |
| --- | --- | --- |
| 2,249,613 | Kinneberg | July 15, 1941 |
| 2,271,319 | Thomas et al. | Jan. 27, 1942 |
| 2,315,024 | Sturgeon | Mar. 30, 1943 |
| 2,405,408 | Connolly | Aug. 6, 1946 |
| 2,478,519 | Ashley et al. | Aug. 9, 1949 |
| 2,480,628 | Bodkin | Aug. 30, 1949 |